United States Patent [19]

Drossbach

[11] 4,024,894
[45] May 24, 1977

[54] PERFORATED CORRUGATED TUBE AND METHOD AND APPARATUS FOR MANUFACTURING THE SAME

[76] Inventor: Hubert Drossbach, 8852 Rain am Lech, Germany

[22] Filed: Mar. 17, 1975

[21] Appl. No.: 558,949

Related U.S. Application Data

[63] Continuation of Ser. No. 384,121, July 30, 1973, abandoned.

[52] U.S. Cl. ............................................. 138/121
[51] Int. Cl.² ......................................... F16L 11/11
[58] Field of Search .......... 138/121, 122, 173, 177, 138/178, DIG. 11; 61/16

[56] References Cited

UNITED STATES PATENTS

| 590,490 | 9/1897 | Thomas | 61/16 X |
| 3,391,424 | 7/1968 | Drossbach | 425/290 |
| 3,878,685 | 4/1975 | Schmunk | 138/121 X |

Primary Examiner—Richard E. Aegerter
Assistant Examiner—Richard R. Stearns
Attorney, Agent, or Firm—Donnelly, Maky, Renner & Otto

[57] ABSTRACT

A perforated corrugated tube of thermoplastic or like material in which the tube is made with radially inwardly extending blisters in the valleys thereof which are sheared off to provide perforations through the valleys of the corrugations, the apparatus and method being characterized in that the perforated corrugated tube is made in a continuous manner by molding the tube with the blisters in a traveling mold and shearing the blisters as the tube emerges from the traveling mold. A further characterizing feature of the perforated corrugated tube herein rendering it useful as for highway drainage and frostproofing purposes, is that it is formed with a smooth walled channel-like bottom portion having upwardly diverging side walls merging with the remaining perforated corrugated portion of the tube.

1 Claim, 9 Drawing Figures

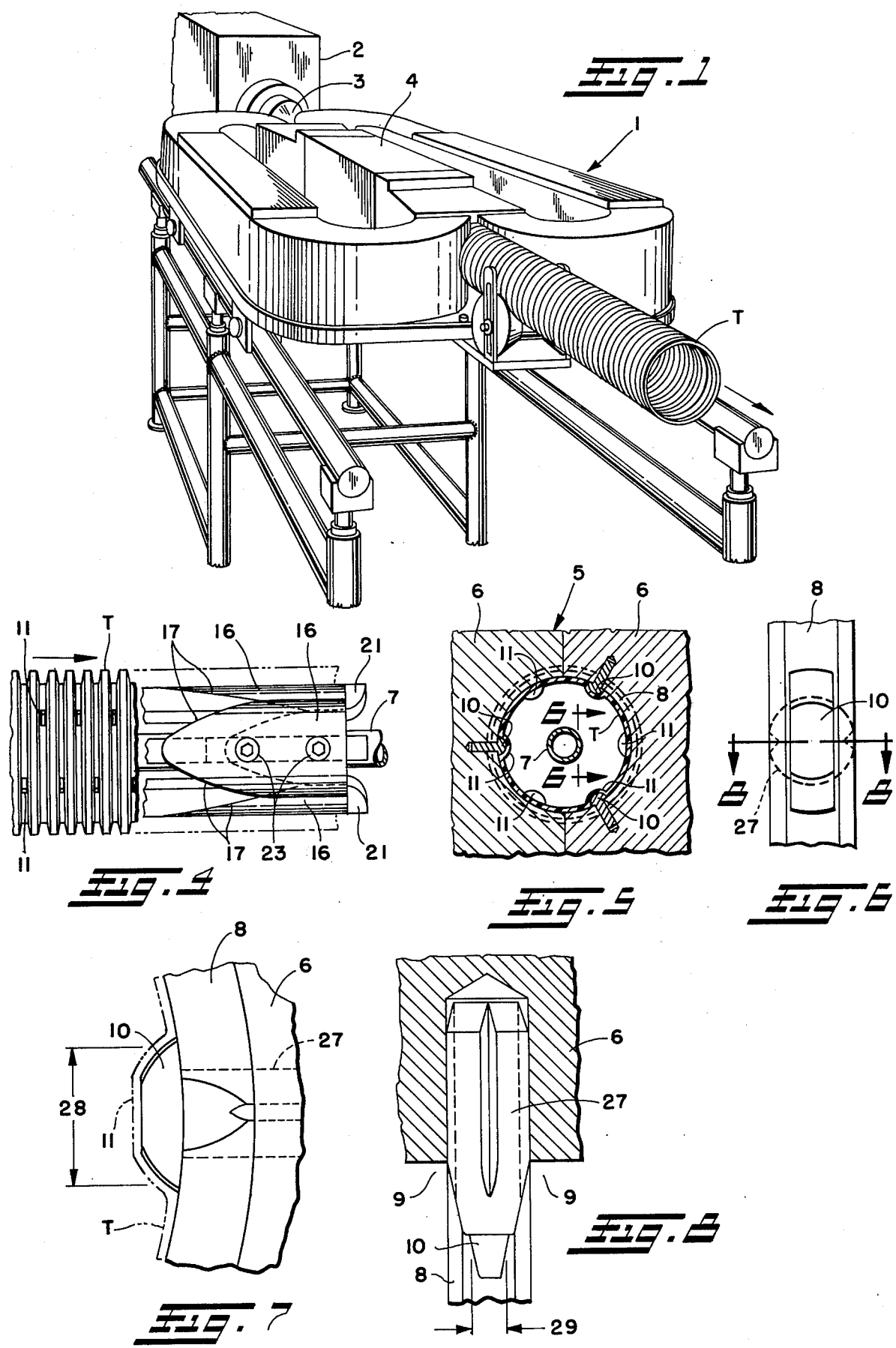

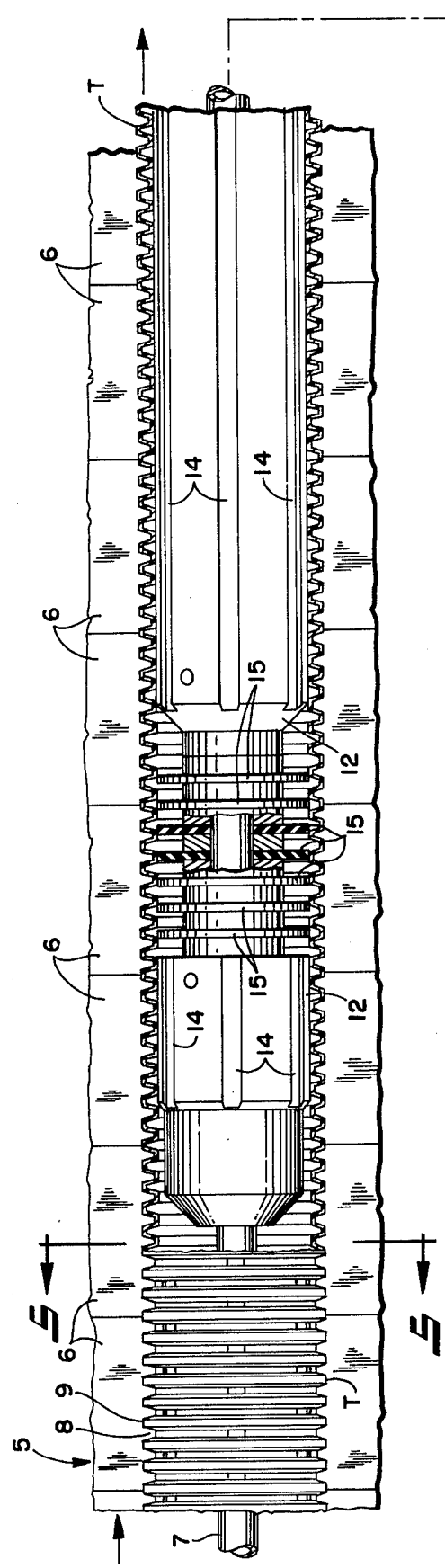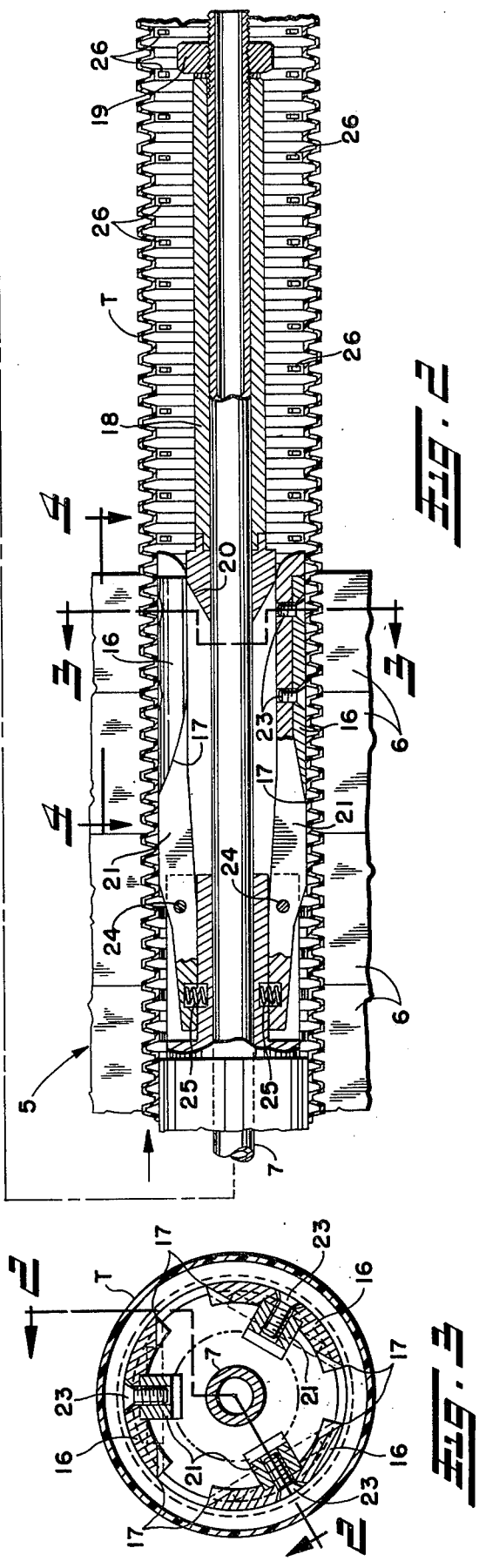

PERFORATED CORRUGATED TUBE AND METHOD AND APPARATUS FOR MANUFACTURING THE SAME

This is a continuation, of application Ser. No. 384,121, now abandoned, filed July 30, 1973.

BACKGROUND OF THE INVENTION

It is known as disclosed for example in the Drossbach U.S. Pat. No. 3,391,424 granted July 9, 1968 to provide apparatus for manufacturing perforated corrugated tube in which cutter means adjacent the exit end of traveling molds is operative to cut longitudinal grooves through the wall thickness of the valleys of the corrugations. In a perforated corrugated tube made with the apparatus of said U.S. Pat. No. 3,391,424 the radial heighth of the corrugations is decreased at the locations of the perforations, and hence, the crush strength of the corrugated tube may be substantially decreased in view of such strength being related to the cube of the heighth of the corrugations. Moreover, with the apparatus of U.S. Pat. No. 3,319,424 all of the corrugations of the tube are perforated along lines extending parallel to the axis of the tube, and therefore, the crushing strength weaknesses extend throughout the length of the tube along such lines of perforations.

SUMMARY OF THE INVENTION

It is a principal object of this invention to provide a perforated corrugated tube which is made with radially inwardly projecting blisters in the valleys of the corrugations and is perforated by shearing off the blisters (or part of them) without decreasing the radial height of the corrugations, thus to provide a strong perforated corrugated tube which has perforations through the valleys of the corrugations which may be of any shape but preferably are in the form of circumferential slots or slits which are relatively narrow in the axial direction.

It is another object of this invention to provide a perforated corrugated tube in which the bottom portion of the tube is in the form of a smooth walled, unperforated channel of which the side walls merge with the perforated corrugated portion of the tube.

It is another object of this invention to provide an apparatus for continuously making a perforated corrugated tube having a traveling mold which forms a corrugated tube with internal blisters at the valleys of the corrugations of the tube, and having shearing means at the exit end of the traveling mold operative to shear off the blisters as the tube continuously emerges from the traveling mold, the shearing off of the blisters being effective to form perforations in the valleys of the corrugations without decrease in the radial height of the latter.

It is another object of this invention to provide a method of forming a perforated corrugated tube which comprises the successive steps of continuously molding a corrugated tube with interior blisters in the valleys of the corrugations and shearing off the blisters as the molded tube travels over a stationary knife disposed within the tube and adjacent the exit end of the mold as the tube emerges therefrom.

Other objects and advantages will appear from the ensuing description.

BRIEF DESCRIPTION OF THE DRAWING

FIG. 1 is a perspective view of apparatus for continuously producing a perforated tube;

FIG. 2 is a central longitudinal cross-section view in a vertical plane at the end of the apparatus from which the tube is continuously discharged, except that in the region of the knives, the section is along line 2—2, FIG. 3;

FIG. 3 is a transverse cross-section view on enlarged scale taken along line 3—3, FIG. 2;

FIG. 4 is an elevation view of the blister shearing knives as viewed along the line 4—4, FIG. 2, the corrugated tube in advance of the knives being shown in elevation;

FIG. 5 is a cross-section view taken along line 5—5, FIG. 2;

FIGS. 6, 7 and 8 are enlarged views illustrating a portion of the mold which forms a radially inwardly projecting blister in the valley of the corrugation of the molded tube, FIG. 6 being a view along line 6—6, FIG. 5, FIG. 7 being a view from the right side of FIG. 6, and FIG. 8 being a view along line 8—8, FIG. 6.

DETAILED DESCRIPTION OF THE PREFERRED EMBODIMENT

Figure 9:
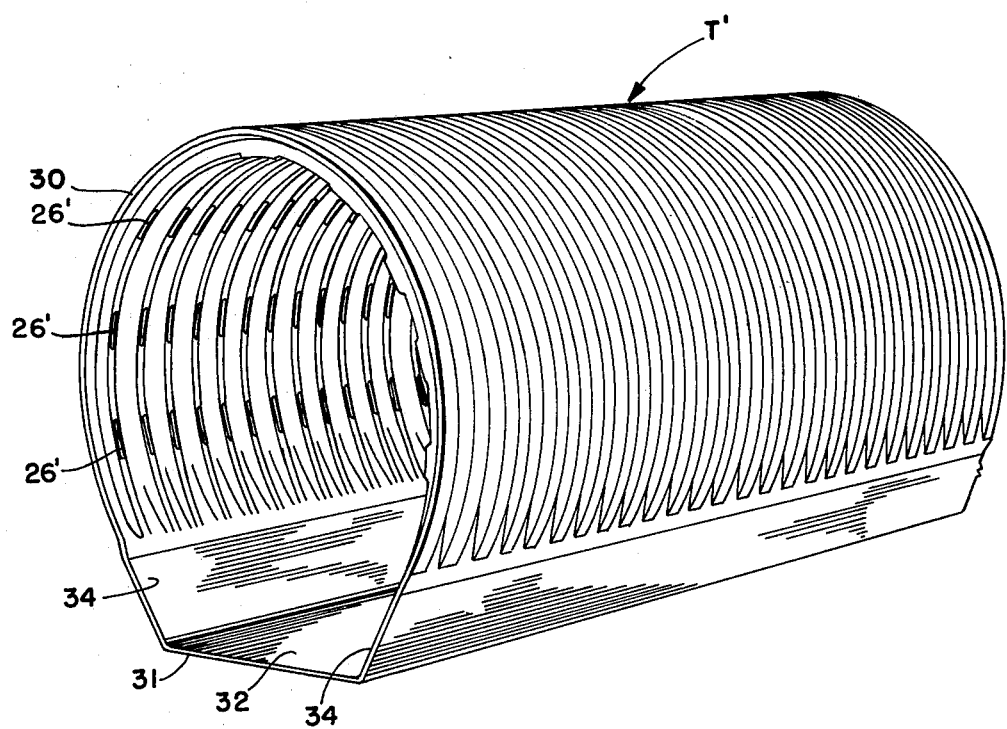
FIG. 9 is a perspective view of a modified form of perforated corrugated tube.

As shown in FIGS. 1-5 the apparatus 1 herein comprises an extruder 2 having a nozzle 3 with an annular die; and a molding apparatus 4 having a traveling mold 5 into which the nozzle 3 discharges plastic material as the mold sections 6 come together into mating engagement. Air under pressure is conducted within the plasticized tubular body of material as through a tube 7 to cause the plasticized tubular body of material to conform to the shape of the cavity defined by the longitudinally traveling mating mold sections 6. In the present case wherein it is desired to form corrugated plastic tube T, the mating mold sections 6 are provided with alternate ribs 8 and grooves 9 which are normal to the longitudinal axis but obviously, if desired, said ribs 8 and grooves 9 may be helical so as to form a tube T having helical corrugations. As apparent each rib 8 of the mold 5 defines the valley of a corrugation of the tube T and has one or more radially inwardly projecting portions 10 which cause the tube T to be formed with radially inwardly extending blisters 11.

At the exit end of the traveling mold 5 the mold sections 6 separate, whereupon the corrugated tube T with blisters 11 continuously emerges from said end of the apparatus 4.

The nozzle 3 has secured thereto the tube 7 which has adjacent the exit end of the traveling mold 5 a plug 12 which is grooved as at 14 to permit longitudinal movement of the tube T with the blisters 11 passing through the grooves 14, and the plug 12 will preferably be provided with a series of neoprene or like flexible washers 15 which may be of diameter slightly greater than the minor diameter of the corrugated tube T, said washers 15 being deformable as the tube T with the blisters 11 passes thereover and thus serving as seals to maintain air pressure within the tube T for forming the plasticized material. As the corrugated tube T with the blister 11 travels through the mold 5 it is cooled so that it assumes a solidified or partly solidified form and, in the region of the exit end of the traveling mold 5 where the mold sections 6 commence to separate from each other, the plug 12 is provided with a series of knives 16 which have cutting edges 17 operative to shear off the blisters 11 as the corrugated tube T passes over said knives 16. The knives 16 are radially adjusted by screw means 18 locked by lock nut 19, said screw means 18 having a cam surface 20 engaging the bars 21 to which the knives 16 are secured by screws 23. The bars 21 are pivoted to plug 12 by pins 24 and are biased by springs 25 as shown.

In the form of the invention shown in FIGS. 1–8, each corrugation of the tube T has three equally spaced apart blisters 11 which are circumferentially offset from the blisters 11 of adjacent corrugations, and said blisters 11 become rectangular slots or perforations 26 when the blisters 11 are cut away. Each knife 16 has a cutting edge 17 arranged to shear off two blisters 11 successively as the corrugated tube T travels therepast, and because the blisters 11 are circumferentially and axially staggered, the cutting load is distributed on the respective knives 16. It is to be understood that any number of blisters 11 may be formed in the tube T, and that the perforations 26 may be of shape other than rectangular, such as circular, oval, etc.

As best shown in FIGS. 6–8, the projections 10 are formed by grooved pins 27 driven or press-fitted in or screwed into radial holes in the mold sections 6 with the shanks being tapered to be flush with the tapered flanks of the ribs 8 and with the half round heads being shaped to constitute the projections 10. When the knives 16 are adjusted by the screw means 18 so that the cutting edges 17 are at the minor diameter of the tube T, the perforations 26 will be of generally rectangular form of length 28 (FIG. 7) and width 29 (FIG. 8). By reason of the tapered ends and sides of the projections 10 the length 28 and width 29 of the perforations 26 will be decreased as the knives 16 are adjusted radially inwardly thereby to decrease the flow areas of the perforations.

From the foregoing it is apparent that the present method involves the continuous forming of a corrugated tube T having inwardly extending blisters 11 in the valleys of the corrugations, and as the tube T emerges from the molding apparatus 4, the stationary knives 16 within the corrugated tube T are effective to shear off the blisters 11 to continuously produce a perforated corrugated tube T which has perforations 26 through the valleys of the corrugations without decrease in radial height and strength of the corrugations.

In FIG. 9 is shown a modified form of perforated corrugated tube T' having a corrugated upper portion 30 having a plurality of rows of perforations 26' through the valleys of the corrugations and a channel-like lower portion 31 having smooth, unperforated bottom and side walls 32 and 34 of which the side walls 34 diverge upwardly and merge with the lower ends of the corrugations of the corrugated portion 30. The tube T' has been found useful as for highway drainage and frostproofing purposes with the corrugated upper portion 30 providing a multiplicity of perforations 26' (herein eight uniformly spaced apart rows of perforations 26') for good drainage and with the lower channel portion 31 providing smooth interior walls 32 and 34 for unimpeded drainage flow.

By way of specific examples, tubes T' of 78, 98, and 145 mm. I.D. have bottom walls 31 of 51, 62, and 92 mm. width, and corrugations which extend circumferentially about 220° at full radial depth and which taper to zero radial depth as they merge with the side walls 34 of the channel portion 31. As evident, the tube T' may be extruded by use of apparatus 1 wherein the mold parting line extends longitudinally along the middles of the corrugated upper portion 30 and the channel portion 31.

The embodiments of the invention in which an exclusive property or privilege is claimed are defined as follows:

1. A molded seamless corrugated plastic tube having circumferentially spaced apart perforations through the valleys of the corrugations, said perforations being of generally rectangular form elongated in the circumferential direction and being characterized in that said perforations are defined by side and end walls which comprise molded surfaces extending through the entire radial wall thickness of said valleys and converging toward the interior of the tube, and in that the radially inner surfaces of said side and end walls which bound said perforations are sheared surfaces extending axially of said tube at a diameter no greater than the minor diameter of said corrugations.

* * * * *